(12) United States Patent
Yu (10) Patent No.: US 12,506,814 B2
(45) Date of Patent: Dec. 23, 2025

(54) MESSAGE PROCESSING METHOD AND APPARATUS, DEVICE AND STORAGE MEDIUM

(71) Applicant: Beijing Jingdong Tuoxian Technology Co., Ltd., Beijing (CN)

(72) Inventor: Zhenjiang Yu, Beijing (CN)

(73) Assignee: Beijing Jingdong Tuoxian Technology Co., Ltd., Beijing (CN)

( * ) Notice: Subject to any disclaimer, the term of this patent is extended or adjusted under 35 U.S.C. 154(b) by 57 days.

(21) Appl. No.: 18/237,106

(22) Filed: Aug. 23, 2023

(65) Prior Publication Data

US 2024/0073295 A1     Feb. 29, 2024

(30) Foreign Application Priority Data

Aug. 23, 2022    (CN) .......................... 202211015167.6

(51) Int. Cl.
     *H04L 67/55*      (2022.01)
     *H04L 41/0803*      (2022.01)
     *H04L 67/12*      (2022.01)

(52) U.S. Cl.
     CPC .............. *H04L 67/55* (2022.05); *H04L 67/12* (2013.01)

(58) Field of Classification Search
     CPC ................................. H04L 67/55; H04L 67/12
     See application file for complete search history.

(56) References Cited

U.S. PATENT DOCUMENTS

| 11,138,170 | B2 * | 10/2021 | Crossley | ............... H04L 65/612 |
| 2002/0016839 | A1 * | 2/2002 | Smith | .................... G06Q 40/00 709/224 |

(Continued)

FOREIGN PATENT DOCUMENTS

| CN | 110661871 A | 1/2020 |
| CN | 111639138 A | 9/2020 |

(Continued)

OTHER PUBLICATIONS

First Search Report dated Dec. 12, 2024 for Chinese Application No. 202211015167.6. English translation provided.

(Continued)

*Primary Examiner* — Oleg Survillo
(74) *Attorney, Agent, or Firm* — K&L Gates LLP (57) ABSTRACT

Provided are a message processing method and apparatus, a device and a storage medium. The method includes: acquiring a first device message sent by an Internet-of-Things device, where the first device message includes a target message transmission topic name and target device data generated by the Internet-of-Things device; acquiring topic mapping relationship configuration information in a configuration database, where each stream processing topic name in the topic mapping relationship configuration information corresponds to at least one message transmission topic name; determining a target stream processing topic name according to the target message transmission topic name and the topic mapping relationship configuration information; and generating a second device message based on the target device data and the target stream processing topic name and sending the second device message to a stream processing server so that the stream processing server processes the second device message.

20 Claims, 5 Drawing Sheets

(56) References Cited

U.S. PATENT DOCUMENTS

| | | | | |
|---|---|---|---|---|
| 2009/0187635 | A1* | 7/2009 | Lobban | G06Q 10/10 |
| | | | | 709/206 |
| 2009/0228563 | A1* | 9/2009 | Jones | H04L 67/55 |
| | | | | 709/206 |
| 2012/0290655 | A1 | 11/2012 | Jellard | |
| 2018/0287969 | A1 | 10/2018 | Broadhurst et al. | |
| 2019/0089456 | A1* | 3/2019 | Kasilya Sudarsan | G11B 27/34 |
| 2020/0162556 | A1* | 5/2020 | Wood | G06Q 10/06 |
| 2020/0195733 | A1* | 6/2020 | Sethi | H04L 67/12 |
| 2020/0228368 | A1* | 7/2020 | Ferguson | H04L 69/18 |
| 2022/0019462 | A1* | 1/2022 | Nishiguchi | G06F 9/4881 |
| 2024/0028025 | A1* | 1/2024 | Mickley | H04L 67/125 |

FOREIGN PATENT DOCUMENTS

| | | | |
|---|---|---|---|
| CN | 111679918 | A | 9/2020 |
| CN | 112527528 | A | 3/2021 |
| CN | 114285898 | A | 4/2022 |
| CN | 114401239 | A | 4/2022 |
| CN | 114567650 | A | 5/2022 |

OTHER PUBLICATIONS

First Office Action dated Dec. 19, 2024 for Chinese Application No. 202211015167.6. English translation provided.

\* cited by examiner

MESSAGE PROCESSING METHOD AND APPARATUS, DEVICE AND STORAGE MEDIUM

CROSS-REFERENCE TO RELATED APPLICATION(S)

This application claims priority to Chinese Patent Application No. 202211015167.6 filed Aug. 23, 2022, the disclosure of which is incorporated herein by reference in its entirety

TECHNICAL FIELD

Embodiments of the present disclosure relate to the fields of Internet of Things and medical health technology and, in particular, to a message processing method and apparatus, a device and a storage medium.

BACKGROUND

With the rapid development of computer technology, more and more Internet-of-Things devices have been developed and applied to different application scenarios, such as blood glucose devices, blood pressure devices and blood oxygen devices in the medical and health field. A data message generated by each Internet-of-Things device may be used between devices, or may be used by a traffic server to achieve functions such as security audit, traffic charging, data statistics and notification triggering. Each data message undergoes a flow of "acquisition-processing-storage-analysis-application".

At present, the Internet-of-Things device sends the generated message to an acquisition server to achieve the acquisition and distribution of the message in the acquisition server. For example, through a Message Queuing Telemetry Transport (MQTT) protocol, the message is sent to an MQTT broker.

However, at least the problems described below exist in the related art.

Since the acquisition server, which only acquires and distributes the message, is not stream processing and does not support asynchronous processing, an event cannot be stored for a long time or reprocessed, thereby reducing message processing performance.

SUMMARY

Embodiments of the present disclosure provide a message processing method and apparatus, a device and a storage medium.

In a first aspect, embodiments of the present disclosure provide a message processing method applied to an acquisition server. The message processing method includes the steps described below.

A first device message sent by an Internet-of-Things device is acquired, where the first device message includes a target message transmission topic name and target device data generated by the Internet-of-Things device.

Topic mapping relationship configuration information in a configuration database is acquired, where each stream processing topic name in the topic mapping relationship configuration information corresponds to at least one message transmission topic name.

A target stream processing topic name corresponding to the Internet-of-Things device is determined according to the target message transmission topic name and the topic mapping relationship configuration information.

A second device message is generated based on the target device data and the target stream processing topic name, and the second device message is sent to a stream processing server so that the stream processing server processes the second device message.

In a second aspect, embodiments of the present disclosure further provide a message processing apparatus integrated into an acquisition server. The message processing apparatus includes a first device message acquisition module, a mapping relationship configuration information acquisition module, a target stream processing topic name determination module and a second device message generation module.

The first device message acquisition module is configured to acquire a first device message sent by an Internet-of-Things device, where the first device message includes a target message transmission topic name and target device data generated by the Internet-of-Things device.

The mapping relationship configuration information acquisition module is configured to acquire topic mapping relationship configuration information in a configuration database, where each stream processing topic name in the topic mapping relationship configuration information corresponds to at least one message transmission topic name.

The target stream processing topic name determination module is configured to determine a target stream processing topic name corresponding to the Internet-of-Things device according to the target message transmission topic name and the topic mapping relationship configuration information.

The second device message generation module is configured to generate a second device message based on the target device data and the target stream processing topic name, and send the second device message to a stream processing server so that the stream processing server processes the second device message.

In a third aspect, embodiments of the present disclosure further provide a message processing system. The system includes an Internet-of-Things device, an acquisition server and a stream processing server.

The acquisition server is configured to implement the message processing method according to any embodiment of the present disclosure.

In a fourth aspect, embodiments of the present disclosure further provide an electronic device. The electronic device includes one or more processors and a memory configured to store one or more programs.

The one or more processors, when executed by the one or more processors, cause the one or more processors to implement the message processing method according to any embodiment of the present disclosure.

In a fifth aspect, embodiments of the present disclosure further provide a computer-readable storage medium storing a computer program, where the computer program, when executed by a processor, implements the message processing method according to any embodiment of the present disclosure.

These general and specific aspects may be implemented using a system, a method, or a computer program, or any combination of systems, methods, and computer programs.

BRIEF DESCRIPTION OF DRAWINGS

To illustrate technical solutions in the embodiments of the present disclosure or in the related art more clearly, drawings used in description of the embodiments or the related art will be briefly described below. Apparently, the drawings described below illustrate only part of the embodiments of the present disclosure, and those skilled in the art may obtain other drawings based on the drawings described below on the premise that no creative work is done.

DETAILED DESCRIPTION

Hereinafter the present disclosure will be further described in detail in conjunction with the drawings and embodiments. It is to be understood that the specific embodiments set forth below are intended to illustrate and not to limit the present disclosure. Additionally, it is to be noted that for ease of description, only part, not all, of the structures related to the present disclosure are illustrated in the drawings.

Figure 1:
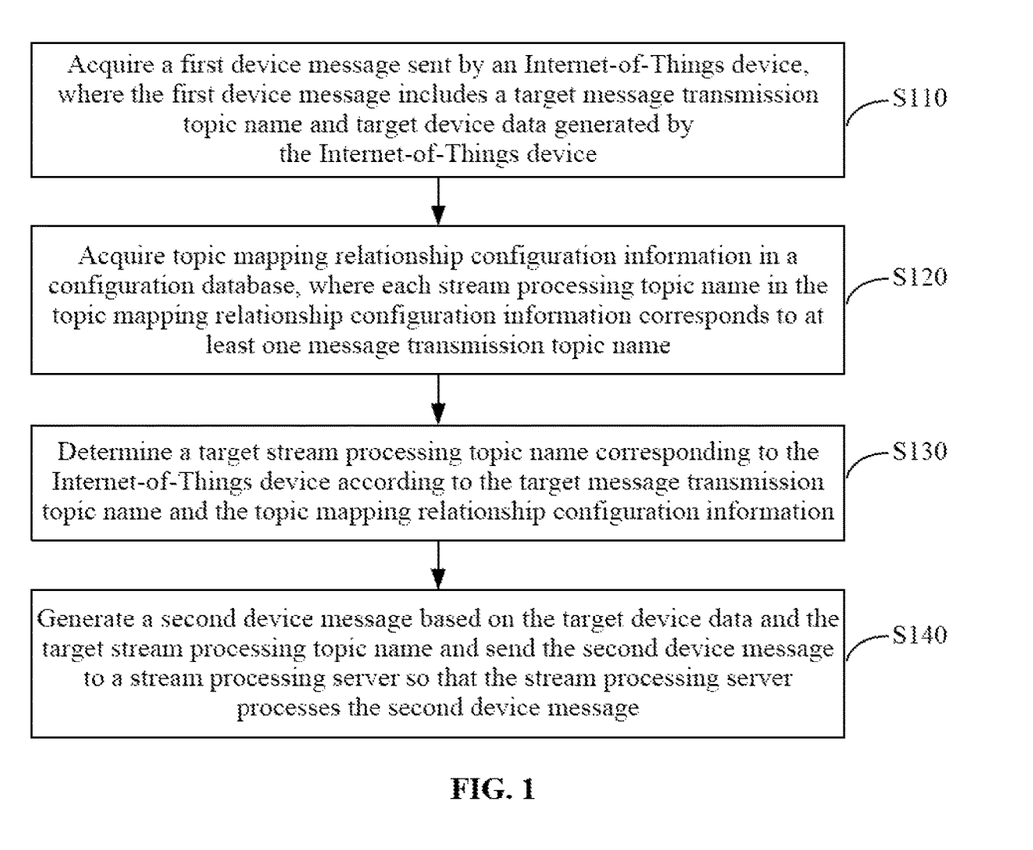
FIG. 1 is a flowchart of a message processing method according to an embodiment of the present disclosure.

FIG. 1 is a flowchart of a message processing method according to an embodiment of the present disclosure. This embodiment may be applicable to a case where a device message acquired by an acquisition server is reported to a stream processing server. The method may be performed by a message processing apparatus, and the apparatus may be implemented by software and/or hardware and integrated into the acquisition server. As shown in FIG. 1, the method includes the steps described below.

In S110, a first device message sent by an Internet-of-Things device is acquired, where the first device message includes a target message transmission topic name and target device data generated by the Internet-of-Things device.

The Internet-of-Things device refers to any smart device capable of Internet-of-Things communication. For example, the Internet-of-Things device may include, but is not limited to, a smart device worn on the body, such as a fitness tracker, an earphone, a smartwatch and any other type of wearable device. The first device message may be a data message generated at a current time moment in the Internet-of-Things device. The target message transmission topic name may refer to a data transmission topic name Topic corresponding to target device data generated at the current time moment in the Internet-of-Things device. For example, when the device message is transmitted through an MQTT protocol, the target message transmission topic name may refer to an MQTT Topic corresponding to the Internet-of-Things device. A message transmission topic name may refer to a message type, and a subscriber may receive a message content of the topic after subscribing.

In an embodiment, the Internet-of-Things device that needs to process the message currently may acquire the generated target device data through a sensor of the Internet-of-Things device and determine the target message transmission topic name based on a device parameter of the Internet-of-Things device. For example, if the Internet-of-Things device is a blood glucose monitoring device with a device manufacturer name of JZYQ in English, a device model of HB3 and a device sequence number SN of ADGX0000001, the target message transmission topic name corresponding to the device is /DATA/DEVICE/SEND/JZYQ-HB3/ADGX0000001. The Internet-of-Things device may generate the first device message based on the target message transmission topic name and the generated target device name and send the first device message to an acquisition server so that the acquisition server can obtain the first device message reported by the Internet-of-Things device in real time.

It is to be noted that only one acquisition server, such as a MQTT broker, may exist in this embodiment, so as to process device messages sent by all Internet-of-Things devices by using the same acquisition server; or an acquisition server cluster may exist in this embodiment, such as a MQTT Cluster which includes multiple MQTT brokers, so as to process the device messages sent by all the Internet-of-Things devices by using the acquisition server cluster, thereby ensuring high availability of message processing and supporting a linear extension.

For example, S110 may include that: a message monitoring module in a preloaded message processing plug-in is called to acquire the first device message sent by the Internet-of-Things device.

The message processing plug-in may achieve a plug-in manner through a hook mechanism provided by the acquisition server, that is, hook declaration, hook registration and hook call, so that stability and instability can be isolated from each other in terms of code design. A kernel of a framework is relatively stable due to weak relevance or irrelevance to a traffic. However, since the message processing plug-in achieves a specific traffic code and varies at any time as a traffic requirement varies, the message processing plug-in is relatively unstable. The message monitoring module may be a function module configured to monitor whether the connected Internet-of-Things device sends the device message.

In an embodiment, each Internet-of-Things device may preload the message processing plug-in and initialize the plug-in so that the loaded message processing plug-in may be used for efficient docking processing of the message, thereby achieving decoupling of message acquisition and message processing. The connection of the Internet-of-Things device to the acquisition server may trigger a connection monitoring module in the message processing plug-in in the acquisition server, for example, a connection operation of the Internet-of-Things device is monitored through an on_connection (Client) function. After a successful connection of the Internet-of-Things device, the generated first device message may be automatically reported to the acquisition server. The acquisition server monitors the first device message sent by the Internet-of-Things device by calling the message monitoring module in the message processing plug-in, for example, the first device message sent by the Internet-of-Things device is monitored through an on_publish (Message) function.

Figure 2:
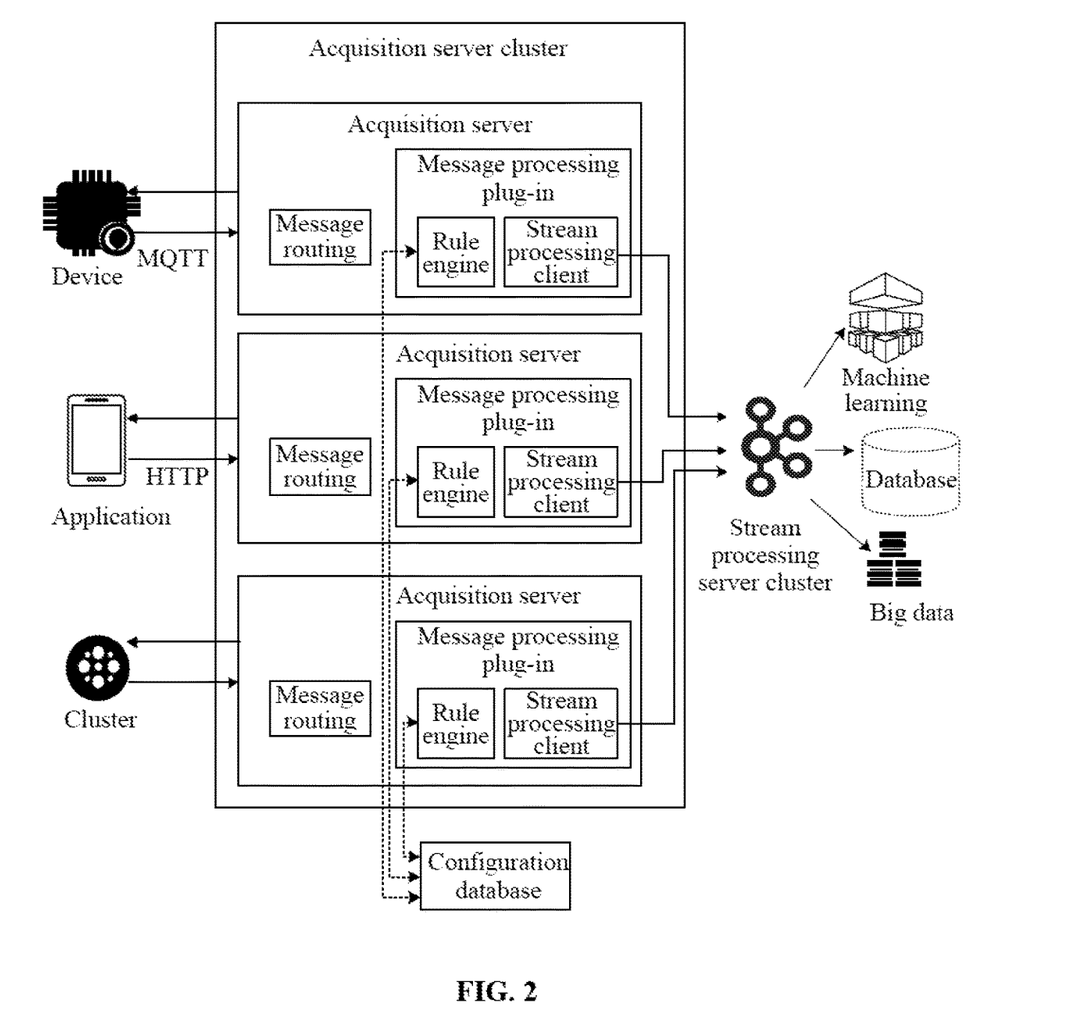
FIG. 2 is an example of an architecture of a message processing system involved in an embodiment of the present disclosure.

For example, FIG. 2 provides an example of an architecture of a message processing system. Each acquisition server in an acquisition server cluster in FIG. 2 preloads a message processing plug-in. The plug-ins are not associated with each other, which is equivalent to the module decoupling of code, thereby improving stability. It is to be noted that loading the message processing plug-in inside the acquisition server can reduce the consumption of a network resource once compared to disposing an additional message docking apparatus, so that data is directly forwarded to the stream processing server after being converted inside the acquisition server, thereby improving docking efficiency between the acquisition server and the stream processing server.

In S120, topic mapping relationship configuration information in a configuration database is acquired, where each stream processing topic name in the topic mapping relationship configuration information corresponds to at least one message transmission topic name.

The configuration database may be configured to store configuration information configured by a user. The topic mapping relationship configuration information may be a mapping relationship between stream processing topic names and message transmission topic names, and the mapping relationship is configured based on the traffic requirement. The stream processing topic name may refer to a topic name Topic in the stream processing server. For example, when the stream processing server is Apache Kafka broker, the stream processing topic name may refer to Kafka Topic, such as stream-hiot-device-misc-online.

Each stream processing topic name may correspond to one or more message transmission topic names to map the one or more message transmission topic names to the same stream processing topic name, thereby solving the problem of the relatively small number of times of connection construction in the stream processing server. The stream processing topic name may refer to a set of messages. For each stream processing topic name, multiple producers may send messages thereto, or multiple consumers may consume the messages therein. The acquisition server and the stream processing server are effectively combined to construct a reliable and safe Internet-of-Things infrastructure.

In an embodiment, the topic mapping relationship configuration information may be configured in the configuration database based on the traffic requirement to achieve dynamic and flexible configuration of the mapping relationship. Thus, when a new Internet-of-Things device is added, only corresponding topic mapping relationship configuration information needs to be modified, for example, a new mapping relationship is added, or the original mapping relationship is changed, and other traffic logics do not need to be modified, thereby simplifying a development operation and improving development efficiency and a maintenance cost. Moreover, the access of a traffic is isolated, so that whether the access of a new traffic is successful does not affect a previously accessed device, and the traffic do not affect each other.

For example, S120 may include that: a rule engine module in the message processing plug-in is called to acquire the topic mapping relationship configuration information in the configuration database.

In an embodiment, as shown in FIG. 2, the acquisition server may call the rule engine module in the message processing plug-in and quickly acquire the topic mapping relationship configuration information from a corresponding configuration database based on connection information of the configuration database.

In S130, a target stream processing topic name corresponding to the Internet-of-Things device is determined according to the target message transmission topic name and the topic mapping relationship configuration information.

In an embodiment, if a correspondence between the message transmission topic name and the stream processing topic name is directly stored in the topic mapping relationship configuration information, a stream processing topic name corresponding to a target message transmission topic name in the topic mapping relationship configuration information may be directly determined as the target stream processing topic name. Alternatively, if a regular expression corresponding to each stream processing topic name is stored in the topic mapping relationship configuration information, the target message transmission topic name is matched with each regular expression to determine whether a corresponding regular expression is satisfied, and a stream processing topic name corresponding to the satisfied regular expression is determined as the target stream processing topic name, so that the target stream processing topic name corresponding to the Internet-of-Things device can be more conveniently determined based on the topic mapping relationship configuration information, thereby reducing computational complexity and ensuring efficient and quick mapping of message forwarding.

It is to be noted that if no successful matching with the target message transmission topic name exists in the topic mapping relationship configuration information, a preset default stream processing topic name may be determined as the target stream processing topic name corresponding to the Internet-of-Things device, so as to forward the device message to a stream processing server corresponding to the default stream processing topic name, thereby avoiding a case of message loss.

For example, S130 may include that: the rule engine module in the message processing plug-in is called and the target stream processing topic name corresponding to the Internet-of-Things device is determined according to the target message transmission topic name and the topic mapping relationship configuration information.

In an embodiment, as shown in FIG. 2, the acquisition server may call the rule engine module in the message processing plug-in and quickly match the target message transmission topic name with the acquired topic mapping relationship configuration information to obtain the target stream processing topic name corresponding to the Internet-of-Things device.

In S140, a second device message is generated based on the target device data and the target stream processing topic name, and the second device message is sent to a stream processing server so that the stream processing server processes the second device message.

The stream processing server may be a platform for performing stream processing on the message. The stream processing server is, but is not limited to, Apache Kafka, Apache Heron, Flink, Apache Pulsar, RabbitMQ and ActiveMQ. Apache Kafka is a highly scalable distributed streaming platform that combines messaging, storage and data processing and constructs a highly scalable, reliable, safe and real-time infrastructure. A user using Kafka generally uses Kafka Connect to integrate with any source or receiver. A Kafka stream is also useful because it allows continuous stream processing. From the point of view of the Internet of Things, the advantages of Apache Kafka are as follows: stream processing instead of just queuing, high throughput, large scale, high availability, long-term storage and buffer, event reprocessing, good integration with other departments of an enterprise, and hybrid, multi-cloud and global deployment. The disadvantages of Kafka are as follows: not including tens of thousands of connection constructions, a need for a stable network and a solid infrastructure, and a lack of functions specific to the Internet of Things, such as maintaining vitality, trace links and covenant. The advantages of MQTT are as follows: widely used, lightweight, having a simple application programming interface (API), constructed specifically for a bad connection and a high latency scheme, and supporting multiple client connections (tens of thousands of times per MQTT server). The disadvantages of MQTT are as follows: just queuing instead of stream processing, unable to process the proliferating of use (no buffer), no support of high scalability in most MQTT servers, asynchronous processing (generally offline for a long time), a lack of good integration with other departments of an enterprise, a single infrastructure (generally somewhere at an edge), and unable to reprocess an event. It can be seen that MQTT is not constructed for high scalability, a longer storage time or easy integration with an old system, but focuses on communication between a client and a server, thereby quickly receiving and processing messages from a large number of smart devices. Apache Kafka is a highly scalable distributed streaming platform. Kafka takes, stores, processes and forwards a large amount of data from thousands of Internet-of-Things devices, thereby combining and docking Apache Kafka and MQTT, constructing a scalable, reliable and safe Internet-of-Things infrastructure and further improving message processing performance.

In an embodiment, an integrated server may generate the second device message based on the target device data and the target stream processing topic name and send the second device message to the stream processing server so that the second device message is processed in the stream processing server, such as performing message storage, processing, forwarding and other operations, thereby improving the message processing performance.

For example, that "the second device message is sent to a stream processing server so that the stream processing server processes the second device message" in S140 may include that: the second device message is sent to a stream processing server cluster so that a target stream processing server in the stream processing server cluster processes the second device message.

In an embodiment, in this embodiment, only one stream processing server may be docked, or the stream processing server cluster may be docked, such as a Kafka Cluster, so as to improve message processing efficiency and scalability. The acquisition server forwards the second device message to the stream processing server cluster. The second device message may be stored in a high-performance stream processing server cluster so that the target stream processing server corresponding to the target stream processing topic name is used for processing the second device message, such as performing message storage, processing, forwarding and other operations. As shown in FIG. 2, the target device data is published to a consumer who subscribes the target stream processing topic name for processing, thereby achieving efficient docking between the acquisition server cluster and the stream processing server cluster.

For example, S140 may include that: a stream processing client module in the message processing plug-in is called to generate the second device message based on the target device data and the target stream processing topic name and the second device message is sent to the stream processing server.

In an embodiment, as shown in FIG. 2, the acquisition server may call the stream processing client module in the message processing plug-in, generates the second device message based on the target device data and the target stream processing topic name and sends the second device message to the stream processing server so that the message forwarding can be quickly performed by using the stream processing client module, thereby achieving efficient docking between the acquisition server cluster and the stream processing server cluster and ensuring high availability and high scalability of a production environment. When the number of users using a certain type of device is increased, if a bottleneck level of the MQTT Cluster is reached, the MQTT Broker can be extended. If the Kafka Cluster is subjected to a relatively large pressure, a scale of the Kafka Cluster can be dynamically adjusted. Capacity expansion and capacity reduction of the MQTT Cluster have no effect on the traffic. The implementation of the traffic is not strongly dependent on specific technologies, and the stability of the system and the rapid development of the traffic can be propelled in parallel.

A new server may be dynamically added to the cluster, thereby enhancing the performance of the cluster. The cluster prevents the client from easily encountering a warning of out of service through server redundancy. In the cluster, the same service may be provided by multiple servers. If one server fails, the other server will take over the failed server. The function provided by the cluster to recover from one erroneous server to the other server enhances availability of an application. To have characteristics of scalability and high availability, the cluster must have the following three capabilities: load balancing (load balancing can distribute tasks relatively evenly to computing and network resources in a cluster environment), failure recovery (for some reason, a resource executing a certain task fails, and a resource executing the same task in another server continues to complete the task. This process that the resource in the other server transparently continues to complete the task because the resource in one server cannot work is called failure recovery) and internal communication (to cooperatively work and achieve the load balancing and the error recovery, each server in the cluster has to communicate frequently, for example, a load balancer performs communication of heartbeat test information of the server and context information about executing a task between servers).

It is to be noted that directly loading the message processing plug-in in the acquisition server can reduce the number of times of direct conversion between different services from data acquisition to data usage. The Internet-of-Things device generally has characteristics of a large amount of acquired data, high reporting frequency and many occupied network resources. To response timely and feed back to the user for subsequent traffic processing, the message needs to be effectively transmitted to the stream processing server cluster to ensure the timeliness of the message and the time sequence of the message. The data is received in the time sequence, which can significantly reduce a computation cost of the data processing, shorten a processing flow and enhance timeliness of an information feedback. The timelier the information is, the higher the value is. Therefore, time intervals of links such as information acquisition, storage, processing, transmission and use should be shortened as much as possible to increase the value of the information.

For example, multiple stream processing server clusters may also be configured in the configuration database, such as Kafka clusters, and mapping relationships between the stream processing topic names and the multiple stream processing server clusters are configured, so that device messages having different stream processing topic names may be forwarded to different stream processing server clusters, thereby ensuring high availability, high scalability and flexibility of the message forwarding by the multiple stream processing server clusters across computer rooms.

For example, a cache may be provided inside the acquisition server, and a probability of data loss due to instability of pushing the message to a Kafka cluster network can be reduced based on a cache mechanism and a hard disk cache mechanism. Moreover, jitters and transient instability of MQTT Cluster and Kafka Cluster communication networks are compatible.

In the technical solution of this embodiment, the topic mapping relationship configuration information is preconfigured so that flexible mapping between the message transmission topic and the stream processing topic can be achieved; moreover, each configured stream processing topic name corresponds to at least one message transmission topic name so that one or more message transmission topic names can be mapped to the same stream processing topic name, thereby solving the problem of the relatively small number of times of connection construction in the stream processing server. The acquisition server can conveniently and quickly determine the target stream processing topic name corresponding to the Internet-of-Things device according to the target message transmission topic name in the first device message sent by the Internet-of-Things device and the topic mapping relationship configuration information in the configuration database and send the second device message generated based on the target device data and the target stream processing topic name to the stream processing server so that the stream processing server processes the second device message, thereby reducing the complexity of docking, ensuring efficient and quick message forwarding, achieving efficient docking between the acquisition server and the stream processing server, performing operations such as message storage, processing and forwarding on the device message in the stream processing server and improving the message processing performance.

On the basis of the above technical solution, after S110, the method may further include that: an allowed acquisition server corresponding to the first device message is determined based on the target message transmission topic name and an allowed message transmission topic name corresponding to each acquisition server in the acquisition server cluster; and if a target acquisition server is not the allowed acquisition server, the first device message is sent to the allowed acquisition server so that the allowed acquisition server performs message processing on the first device message.

In an embodiment, the acquisition server currently performing the message processing in this embodiment is the target acquisition server in the acquisition server cluster. The allowed message transmission topic name that is allowed to be processed may be preconfigured in each acquisition server in the acquisition server cluster. After receiving the first device message, the target acquisition server, that is, the acquisition server performing the message processing at the current time moment may match the target message transmission topic name in the first device message with the allowed message transmission topic name corresponding to the acquisition server by calling a message routing module and determine a successfully matched acquisition server as the allowed acquisition server corresponding to the first device message. Whether the allowed acquisition server is the target acquisition server is detected. If the allowed acquisition server is the target acquisition server, the message processing may continue to be performed in the target acquisition server. If the allowed acquisition server is not the target acquisition server, the first device message is routed to the allowed acquisition server so that the message processing is performed on the first device message in the allowed acquisition server, thereby achieving balanced load and high availability.

For example, that "a second device message is generated based on the target device data and the target stream processing topic name" may include that: a target message coding configuration scheme corresponding to the target stream processing topic name is acquired; coding processing is performed on the target device data based on the target message coding configuration scheme to determine target device coded data; and the second device message is generated based on the target device coded data and the target stream processing topic name.

The message coding configuration scheme may be a message data compression format preconfigured for each stream processing topic name, such as a binary coding scheme and a hexadecimal coding scheme, thereby achieving flexible coding and meeting different traffic requirements.

In an embodiment, the target message coding configuration scheme corresponding to the target stream processing topic name may be determined according to a mapping relationship, preconfigured in the configuration database, between the stream processing topic name and the message coding configuration scheme. The coding processing is performed on the target device data through the target message coding configuration scheme to determine the target device coded data, and the second device message is generated based on the target device coded data and the target stream processing topic name so that the second device message can be coded and compressed through the target message coding configuration scheme and an appropriate data coding scheme can be configured, thereby reducing an amount of network transmission and improving transmission efficiency.

According to the message processing method in the embodiments of the present disclosure, the topic mapping relationship configuration information is preconfigured so that flexible mapping between the message transmission topic and the stream processing topic can be achieved. Moreover, each configured stream processing topic name corresponds to at least one message transmission topic name so that one or more message transmission topic names can be mapped to the same stream processing topic name, thereby solving the problem of the relatively small number of times of connection construction in the stream processing server. The acquisition server can conveniently and quickly determine the target stream processing topic name corresponding to the Internet-of-Things device according to the target message transmission topic name in the first device message sent by the Internet-of-Things device and the topic mapping relationship configuration information in the configuration database and send the second device message generated based on the target device data and the target stream processing topic name to the stream processing server so that the stream processing server processes the second device message, thereby reducing the complexity of docking, ensuring efficient and quick message forwarding, achieving efficient docking between the acquisition server and the stream processing server, performing operations such as message storage, processing and forwarding on the device message in the stream processing server and improving the message processing performance.

Figure 3:
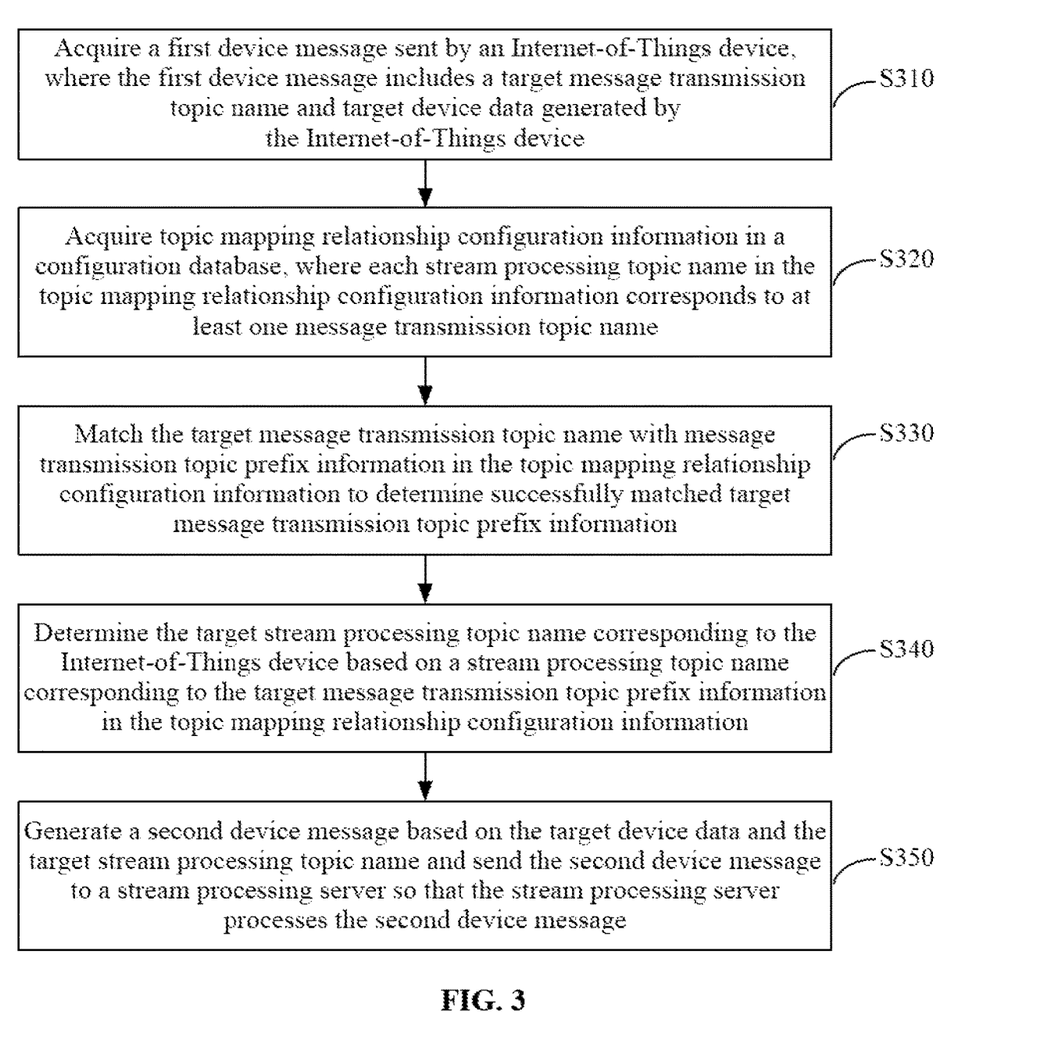
FIG. 3 is a flowchart of another message processing method according to an embodiment of the present disclosure.

FIG. 3 is a flowchart of another message processing method according to an embodiment of the present disclosure. On the basis of the preceding embodiments, the step that "a target stream processing topic name corresponding to the Internet-of-Things device is determined according to the target message transmission topic name and the topic mapping relationship configuration information" is further optimized in this embodiment. Explanations of terms identical to or corresponding to terms in the preceding embodiments are not repeated herein.

Referring to FIG. 3, another message processing method provided in this embodiment includes the steps described below.

In S310, a first device message sent by an Internet-of-Things device is acquired, where the first device message includes a target message transmission topic name and target device data generated by the Internet-of-Things device.

In S320, topic mapping relationship configuration information in a configuration database is acquired, where each stream processing topic name in the topic mapping relationship configuration information corresponds to at least one message transmission topic name.

In S330, the target message transmission topic name is matched with message transmission topic prefix information in the topic mapping relationship configuration information to determine successfully matched target message transmission topic prefix information.

The message transmission topic prefix information may be prefix information of a message topic name preset based on a traffic requirement. If the mapping is required to be matched finer, more detailed message transmission topic prefix information may be set. The topic mapping relationship configuration information may include a one-to-one mapping relationship between the message transmission topic prefix information and the stream processing topic name. For example, the message transmission topic prefix information may be /DATA/DEVICE/SEND/JZYQ-HB3/*, then data messages sent by the same device model, that is, data messages sent by JZYQ-HB3 devices, may all be distributed to the same stream processing topic name.

In an embodiment, information matching may be performed between the target message transmission topic names and pieces of message transmission topic prefix information in the topic mapping relationship configuration information, and message transmission topic prefix information whose prefix is successfully matched is determined as the target message transmission topic prefix information.

It is to be noted that if the target message transmission topic name fails to match all pieces of the message transmission topic prefix information in the topic mapping relationship configuration information, a preset default stream processing topic name may be determined as the target stream processing topic name corresponding to the Internet-of-Things device, so as to forward the device message to a stream processing server corresponding to the default stream processing topic name, thereby avoiding a case of message loss.

In S340, the target stream processing topic name corresponding to the Internet-of-Things device is determined based on a stream processing topic name corresponding to the target message transmission topic prefix information in the topic mapping relationship configuration information.

In an embodiment, if only one piece of successfully matched target message transmission topic prefix information exists in the topic mapping relationship configuration information, the stream processing topic name corresponding to the one piece of target message transmission topic prefix information in the topic mapping relationship configuration information may be directly determined as the target stream processing topic name corresponding to the Internet-of-Things device.

For example, S340 may include that: if at least two pieces of target message transmission topic prefix information exist, priority configuration information corresponding to each of the at least two pieces of target message transmission topic prefix information is acquired; target matching prefix information is determined from the at least two pieces of target message transmission topic prefix information based on the priority configuration information; and a stream processing topic name corresponding to the target matching prefix information in the topic mapping relationship configuration information is determined as the target stream processing topic name corresponding to the Internet-of-Things device.

The priority configuration information may be a matching priority preconfigured for each piece of message transmission topic prefix information. In this embodiment, the priority configuration information may be characterized by a numerical value, and the smaller the numerical value is, the higher the matching priority is.

In an embodiment, when at least two pieces of successfully matched target message transmission topic prefix information exist, the priority configuration information corresponding to each of the at least two pieces of target message transmission topic prefix information may be acquired from the configuration database, the pieces of priority configuration information are compared, target message transmission topic prefix information with a highest priority is used as the target matching prefix information, and the stream processing topic name corresponding to the target matching prefix information in the topic mapping relationship configuration information is determined as the target stream processing topic name so that the target device data can be forwarded to the target stream processing topic name with the highest priority. The flexibility of configuration can be further improved by using the priority to meet a personalized traffic requirement.

For example, when data docking is performed on a MQTT Cluster and a Kafka Cluster, a table field of a mapping table in the configuration database may include a configuration identifier "id", message transmission topic prefix information "lmqtt_topic_prefix", a stream processing topic name "kafka_topic", priority configuration information "match_priority", a deletion identifier "is_delete" (1 indicates deleted, while 0 indicates normal), a valid identifier "is_active" (1 indicates valid, while 0 indicates invalid), a creation timestamp "create_time" and a message coding scheme "content_type".

In S350, a second device message is generated based on the target device data and the target stream processing topic name, and the second device message is sent to a stream processing server so that the stream processing server processes the second device message.

In the technical solution of this embodiment, the target message transmission topic name is matched with the message transmission topic prefix information in the topic mapping relationship configuration information to determine the successfully matched target message transmission topic prefix information, and the target stream processing topic name corresponding to the Internet-of-Things device is determined based on the stream processing topic name corresponding to the target message transmission topic prefix information in the topic mapping relationship configuration information so that multiple message transmission topic names are mapped to one stream processing topic name in a manner of prefix matching, thereby improving topic mapping efficiency and further improving data forwarding efficiency.

The following is an embodiment of a message processing apparatus provided in the embodiments of the present disclosure. The apparatus and the message processing method in the preceding embodiments belong to the same inventive concept. For details not described in detail in the embodiment of the message processing apparatus, reference may be made to the embodiments of the above message processing method.

Figure 4:
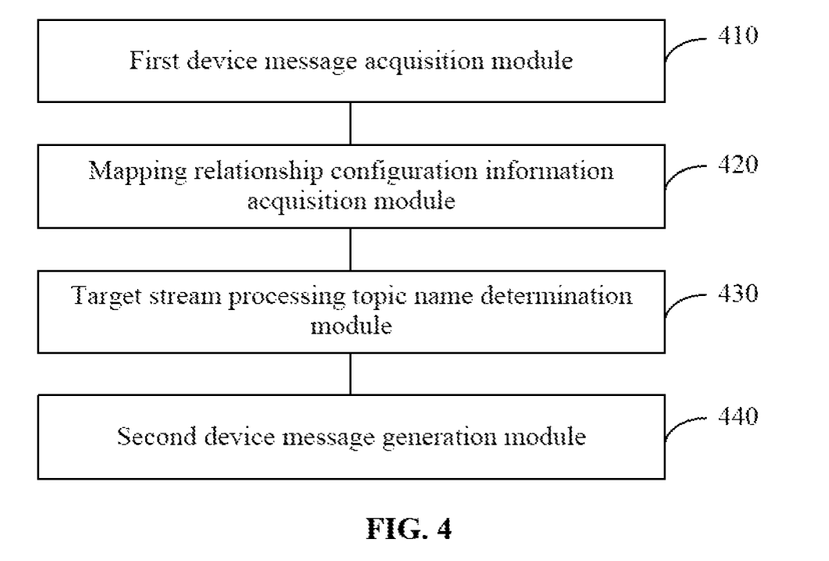
FIG. 4 is a structure diagram of a message processing apparatus according to an embodiment of the present disclosure.

FIG. 4 is a structure diagram of a message processing apparatus according to an embodiment of the present disclosure. This embodiment may be applicable to a case where a device message acquired by an acquisition server is reported to a stream processing server. As shown in FIG. 4, the apparatus is integrated into the acquisition server. The apparatus includes a first device message acquisition module 410, a mapping relationship configuration information acquisition module 420, a target stream processing topic name determination module 430 and a second device message generation module 440.

The first device message acquisition module 410 is configured to acquire a first device message sent by an Internet-of-Things device, where the first device message includes a target message transmission topic name and target device data generated by the Internet-of-Things device. The mapping relationship configuration information acquisition module 420 is configured to acquire topic mapping relationship configuration information in a configuration database, where each stream processing topic name in the topic mapping relationship configuration information corresponds to at least one message transmission topic name. The target stream processing topic name determination module 430 is configured to determine a target stream processing topic name corresponding to the Internet-of-Things device according to the target message transmission topic name and the topic mapping relationship configuration information. The second device message generation module 440 is configured to generate a second device message based on the target device data and the target stream processing topic name and send the second device message to a stream processing server so that the stream processing server processes the second device message.

In the technical solution of this embodiment, the topic mapping relationship configuration information is preconfigured so that flexible mapping between the message transmission topic and the stream processing topic can be achieved. Moreover, each configured stream processing topic name corresponds to at least one message transmission topic name so that one or more message transmission topic names can be mapped to the same stream processing topic name, thereby solving the problem of the relatively small number of times of connection construction in the stream processing server. The acquisition server can conveniently and quickly determine the target stream processing topic name corresponding to the Internet-of-Things device according to the target message transmission topic name in the first device message sent by the Internet-of-Things device and the topic mapping relationship configuration information in the configuration database and send the second device message generated based on the target device data and the target stream processing topic name to the stream processing server so that the stream processing server processes the second device message, thereby reducing the complexity of docking, ensuring efficient and quick message forwarding, achieving efficient docking between the acquisition server and the stream processing server, performing operations such as message storage, processing and forwarding on the device message in the stream processing server and improving message processing performance.

In an embodiment, the target stream processing topic name determination module 430 includes a prefix matching unit and a target stream processing topic name determination unit.

The prefix matching unit is configured to match the target message transmission topic name with message transmission topic prefix information in the topic mapping relationship configuration information to determine successfully matched target message transmission topic prefix information.

The target stream processing topic name determination unit is configured to determine the target stream processing topic name corresponding to the Internet-of-Things device based on a stream processing topic name corresponding to the target message transmission topic prefix information in the topic mapping relationship configuration information.

In an embodiment, the target stream processing topic name determination unit is configured to perform the operations described below.

If at least two pieces of target message transmission topic prefix information exist, priority configuration information corresponding to each of the two pieces of target message transmission topic prefix information is acquired, target matching prefix information is determined from the two pieces of target message transmission topic prefix information based on the priority configuration information, and a stream processing topic name corresponding to the target matching prefix information in the topic mapping relationship configuration information is determined as the target stream processing topic name corresponding to the Internet-of-Things device.

In an embodiment, the second device message generation module 440 is configured to perform the operations described below.

A target message coding configuration scheme corresponding to the target stream processing topic name is acquired, coding processing is performed on the target device data based on the target message coding configuration scheme to determine target device coded data, and the second device message is generated based on the target device coded data and the target stream processing topic name.

In an embodiment, the first device message acquisition module 410 is configured to call a message monitoring module in a preloaded message processing plug-in to acquire the first device message sent by the Internet-of-Things device.

The mapping relationship configuration information acquisition module 420 and the target stream processing topic name determination module 430 are configured to perform the following operations: a rule engine module in the message processing plug-in is called to acquire the topic mapping relationship configuration information in the configuration database, and the target stream processing topic name corresponding to the Internet-of-Things device is determined according to the target message transmission topic name and the topic mapping relationship configuration information.

The second device message generation module 440 is configured to perform the following operations: a stream processing client module in the message processing plug-in is called to generate the second device message based on the target device data and the target stream processing topic name and send the second device message to the stream processing server.

In an embodiment, the acquisition server is a target acquisition server in an acquisition server cluster, and the target acquisition server is connected to the Internet-of-Things device.

The apparatus further includes a routing module. The routing module is configured to determine, after acquiring the first device message sent by the Internet-of-Things device, an allowed acquisition server corresponding to the first device message based on the target message transmission topic name and an allowed message transmission topic name corresponding to each acquisition server in the acquisition server cluster. If the target acquisition server is not the allowed acquisition server, the first device message is sent to the allowed acquisition server so that the allowed acquisition server performs message processing on the first device message.

In an embodiment, the second device message generation module 440 is further configured to send the second device message to a stream processing server cluster so that a target stream processing server in the stream processing server cluster processes the second device message.

The message processing apparatus provided in the embodiments of the present disclosure may perform the message processing method provided in any embodiment of the present disclosure and has functional modules and beneficial effects corresponding to the performed message processing method.

It is to be noted that units and modules included in the embodiment of the above message processing apparatus are just divided according to functional logic, and the division is not limited to this, as long as the corresponding functions can be achieved. In addition, the specific names of the each functional unit are just intended for distinguishing, and are not to limit the protection scope of the present disclosure.

Figure 5:
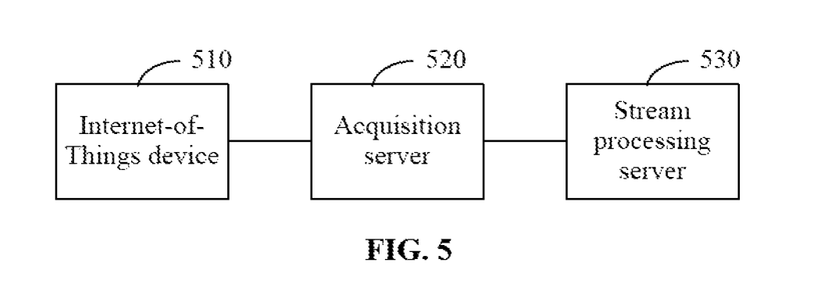
FIG. 5 is a structure diagram of a message processing system according to an embodiment of the present disclosure.

FIG. 5 is a structure diagram of a message processing system according to an embodiment of the present disclosure. This embodiment may be applicable to a case where a device message acquired by an acquisition server is reported to a stream processing server. As shown in FIG. 5, the system includes an Internet-of-Things device 510, an acquisition server 520 and a stream processing server 530.

Multiple Internet-of-Things devices 510 may be provided. The acquisition server 520 may exist in the form of a cluster, and the stream processing server 530 may also exist in the form of a cluster. The acquisition server 520 is configured to implement the message processing method according to any embodiment of the present disclosure.

In the message processing system of this embodiment, the acquisition server can conveniently and quickly determine the target stream processing topic name corresponding to the Internet-of-Things device according to the target message transmission topic name in the first device message sent by the Internet-of-Things device and the topic mapping relationship configuration information in the configuration database and send the second device message generated based on the target device data and the target stream processing topic name to the stream processing server so that the stream processing server processes the second device message, thereby reducing the complexity of docking, ensuring efficient and quick message forwarding, achieving efficient docking between the acquisition server and the stream processing server, performing operations such as message storage, processing and forwarding on the device message in the stream processing server and improving the message processing performance.

Figure 6:
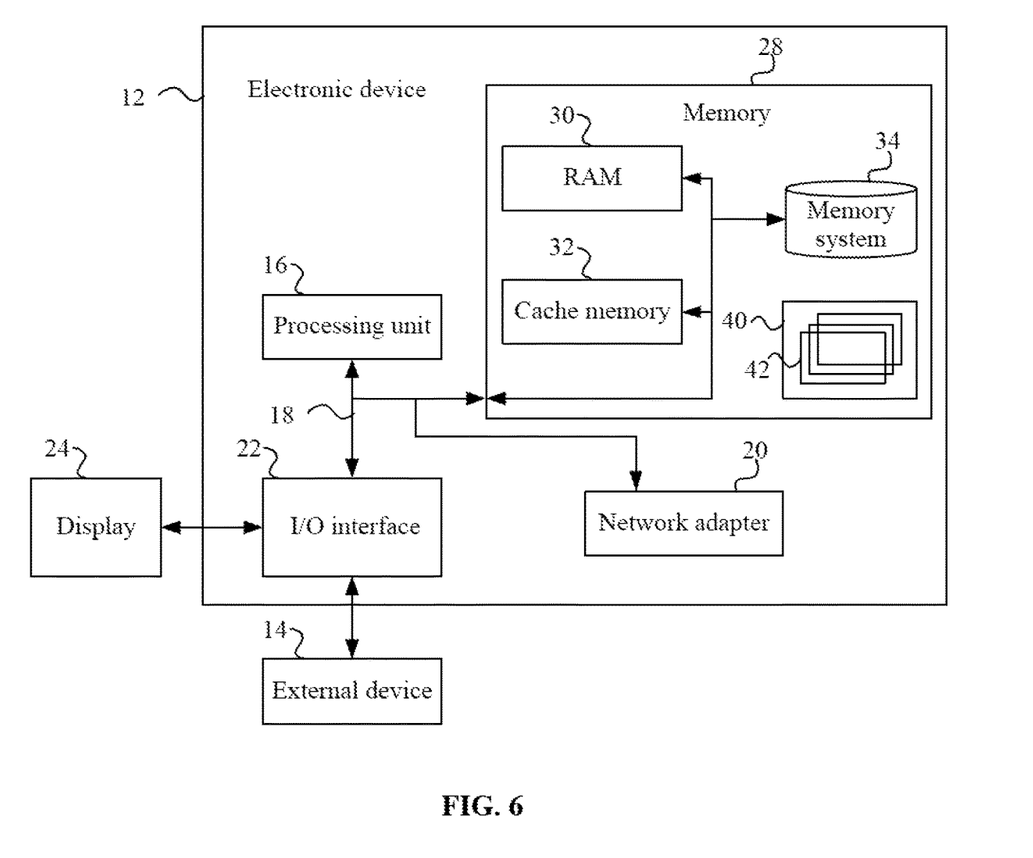
FIG. 6 is a structure diagram of an electronic device according to an embodiment of the present disclosure.

FIG. 6 is a structure diagram of an electronic device according to an embodiment of the present disclosure. FIG. 6 illustrates a block diagram of an example electronic device 12 for implementing embodiments of the present disclosure. The electronic device 12 shown in FIG. 6 is merely an example and is not intended to limit the function and use scope of the embodiments of the present disclosure.

As shown in FIG. 6, the electronic device 12 may take a form of a general-purpose computer device. Components of the electronic device 12 may include, but is not limited to, one or more processors or processing units 16, a system memory 28, and a bus 18 connecting different system components (including the system memory 28 and the one or more processing units 16).

The bus 18 represents one or more of several types of bus architectures, including a memory bus or a memory controller, a peripheral bus, an Accelerated Graphics Port, a processor, or a local bus using any one of multiple bus architectures. For example, these architectures include, but are not limited to, an Industry Standard Architecture (ISA) bus, a Micro Channel Architecture (MAC) bus, an enhanced ISA bus, a Video Electronics Standards Association (VESA) local bus and a Peripheral Component Interconnect (PCI) bus.

The electronic device 12 typically includes multiple computer system readable media. These media may be available media that can be accessed by the electronic device 12. These media include volatile and non-volatile media, and removable and non-removable media.

The system memory 28 may include a computer system readable medium in the form of a volatile memory, such as a random-access memory (RAM) 30 and/or a cache memory 32. The electronic device 12 may further include other removable/non-removable and volatile/non-volatile computer system storage media. Just for example, a memory system 34 may be configured to perform reading and writing on a non-removable and non-volatile magnetic medium (not shown in FIG. 6 and usually referred to as a "hard disk driver"). Although not shown in FIG. 6, it is feasible to provide not only a magnetic disk driver for performing reading and writing on a removable non-volatile magnetic disk (for example, a "floppy disk"), but also an optical disk driver for performing reading and writing on a removable non-volatile optical disk, such as a CD-ROM, a DVD-ROM or other optical media. In such cases, each driver may be connected to the bus 18 via one or more data medium interfaces. The system memory 28 may include at least one program product having a group of program modules (for example, at least one program module). These program modules are configured to perform functions of various embodiments of the present disclosure.

A program/utility 40 having a group of program modules 42 (at least one program module 42) may be stored in the system memory 28 or the like. Such program modules 42 include, but are not limited to, an operating system, one or more application programs, other program modules and program data. Each or some combination of these examples may include implementation of a network environment. Each program module 42 generally executes functions and/or methods in the embodiments of the present disclosure.

The electronic device 12 may communicate with one or more external devices 14 (for example, a keyboard, a pointing device or a display 24). The electronic device 12 may communicate with one or more devices that enable a user to interact with the electronic device 12, and/or with any device (for example, a network card or a modem) that enables the electronic device 12 to communicate with one or more other computing devices. These communications may be performed through an input/output (I/O) interface 22.

Moreover, the electronic device 12 may communicate with one or more networks (such as a local area network (LAN), a wide area network (WAN) and/or a public network, for example, the Internet) through a network interface controller 20. As shown in the figure, the network interface controller 20 communicates with other modules of the electronic device 12 via the bus 18. It is to be understood that although not shown in FIG. 6, other hardware and/or software modules may be used in conjunction with the electronic device 12. The other hardware and/or software modules include, but are not limited to, microcode, a device driver, a redundant processing unit, an external disk drive array, an RAID system, a tape driver, a data backup storage system and the like.

The one or more processing units 16 execute a program stored in the system memory 28 to perform various functional applications and data processing, for example, to perform steps of a message processing method according to an embodiment of the present disclosure. The method includes the steps described below.

A first device message sent by an Internet-of-Things device is acquired, where the first device message includes a target message transmission topic name and target device data generated by the Internet-of-Things device.

Topic mapping relationship configuration information in a configuration database is acquired, where each stream processing topic name in the topic mapping relationship configuration information corresponds to at least one message transmission topic name.

A target stream processing topic name corresponding to the Internet-of-Things device is determined according to the target message transmission topic name and the topic mapping relationship configuration information.

A second device message is generated based on the target device data and the target stream processing topic name, and the second device message is sent to a stream processing server so that the stream processing server processes the second device message.

Certainly, it is to be understood by those skilled in the art that the processor can also implement the technical solution of the message processing method according to any embodiment of the present disclosure.

This embodiment provides a computer-readable storage medium storing a computer program, where the program, when executed by a processor, implements the message processing method according to any embodiment of the present disclosure. The method includes the steps described below.

A first device message sent by an Internet-of-Things device is acquired, where the first device message includes a target message transmission topic name and target device data generated by the Internet-of-Things device.

Topic mapping relationship configuration information in a configuration database is acquired, where each stream processing topic name in the topic mapping relationship configuration information corresponds to at least one message transmission topic name.

A target stream processing topic name corresponding to the Internet-of-Things device is determined according to the target message transmission topic name and the topic mapping relationship configuration information.

A second device message is generated based on the target device data and the target stream processing topic name, and the second device message is sent to a stream processing server so that the stream processing server processes the second device message.

The computer storage medium of the embodiments of the present disclosure may use any combination of one or more computer-readable media. The computer-readable medium may be a computer-readable signal medium or a computer-readable storage medium. The computer-readable storage medium may be, but is not limited to, an electrical, magnetic, optical, electromagnetic, infrared or semiconductor system, apparatus or device, or any combination thereof. More specific examples of the computer-readable storage medium include (non-exhaustive list): an electrical connection having one or more wires, a portable computer magnetic disk, a hard disk, a random-access memory (RAM), a read-only memory (ROM), an erasable programmable read-only memory (EPROM or flash memory), an optical fiber, a portable compact disk read-only memory (CD-ROM), an optical memory device, a magnetic memory device, or any suitable combination thereof. In this document, the computer-readable storage medium may be any tangible medium including or storing a program. The program may be used by or used in conjunction with an instruction execution system, apparatus, or device.

The computer-readable signal medium may include a data signal propagated in a baseband or as part of a carrier. Computer-readable program codes are carried in the data signal. The data signal propagated in this manner may be in multiple forms and includes, but is not limited to, an electromagnetic signal, an optical signal or any suitable combination thereof. The computer-readable signal medium may be any computer-readable medium other than the computer-readable storage medium. The computer-readable medium may send, propagate, or transmit a program used by or used in conjunction with an instruction execution system, apparatus, or device.

Program codes included in the computer-readable medium may be transmitted via any suitable medium. The medium includes, but is not limited to, a wireless, a wire, an optical cable, RF or the like, or any appropriate combination thereof.

Computer program codes for performing the operations of the present disclosure may be written in one or more programming languages or a combination thereof, the programming languages including object-oriented programming languages such as Java, Smalltalk, C++ and further including conventional procedural programming languages such as C programming language or similar programming languages. The program codes may be executed entirely on a user computer, executed partly on a user computer, executed as a stand-alone software package, executed partly on a user computer and partly on a remote computer, or executed entirely on a remote computer or a server. In the case relate to the remote computer, the remote computer may be connected to the user computer via any kind of network including a local area network (LAN) or a wide area network (WAN), or may be connected to an external computer (for example, via the Internet through an Internet service provider).

Those of ordinary skill in the art should know that the above modules or steps of the present disclosure may be implemented by a general-purpose computing apparatus, the modules or steps may be concentrated on a single computing apparatus or distributed on a network composed of multiple computing apparatuses. Optionally, the modules or steps may be implemented by program codes executable by the computing apparatus, so that the modules or steps may be stored in a storage apparatus and executed by the computing apparatus. Alternatively, the modules or steps may be made into integrated circuit modules separately, or multiple modules or steps therein may be made into a single integrated circuit module for implementation. Thus, the present disclosure is not intended to limit any specific combination of hardware and software.

It is to be noted that the preceding are only preferred embodiments of the present disclosure and technical principles used therein. It is to be understood by those skilled in the art that the present disclosure is not limited to the embodiments described herein. Those skilled in the art can make various apparent modifications, adaptations and substitutions without departing from the protection scope of the present disclosure. Therefore, while the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A message processing method, applied to an acquisition server, comprising:
   acquiring a first device message sent by an Internet-of-Things device, wherein the first device message comprises a target message transmission topic name and target device data generated by the Internet-of-Things device; wherein the target message transmission topic name refers to a data transmission topic name corresponding to the target device data generated by the Internet-of-Things device;
   acquiring topic mapping relationship configuration information in a configuration database, wherein each stream processing topic name in the topic mapping relationship configuration information corresponds to at least one message transmission topic name; wherein the each stream processing topic name refers to a topic name in a stream processing server;
   determining a target stream processing topic name corresponding to the Internet-of-Things device according to the target message transmission topic name and the topic mapping relationship configuration information; wherein the target message transmission topic name corresponds to one of the at least one message transmission topic name; and
   generating a second device message based on the target device data and the target stream processing topic name, and sending the second device message to a stream processing server corresponding to the target stream processing topic name so that the stream processing server corresponding to the target stream processing topic name processes the second device message.

2. The method according to claim 1, wherein determining the target stream processing topic name corresponding to the Internet-of-Things device according to the target message transmission topic name and the topic mapping relationship configuration information comprises:
   matching the target message transmission topic name with message transmission topic prefix information in the topic mapping relationship configuration information to determine successfully matched target message transmission topic prefix information; and
   determining the target stream processing topic name corresponding to the Internet-of-Things device based on a stream processing topic name corresponding to the target message transmission topic prefix information in the topic mapping relationship configuration information.

3. The method according to claim 2, wherein determining the target stream processing topic name corresponding to the Internet-of-Things device based on the stream processing topic name corresponding to the target message transmission topic prefix information in the topic mapping relationship configuration information comprises:
   in a case where at least two pieces of target message transmission topic prefix information exist, acquiring priority configuration information corresponding to each of the at least two pieces of target message transmission topic prefix information;
   determining target matching prefix information from the at least two pieces of target message transmission topic prefix information based on the priority configuration information; and
   determining a stream processing topic name corresponding to the target matching prefix information in the topic mapping relationship configuration information as the target stream processing topic name corresponding to the Internet-of-Things device.

4. The method according to claim 1, wherein generating the second device message based on the target device data and the target stream processing topic name comprises:
   acquiring a target message coding configuration scheme corresponding to the target stream processing topic name;
   performing coding processing on the target device data based on the target message coding configuration scheme to determine target device coded data; and
   generating the second device message based on the target device coded data and the target stream processing topic name.

5. The method according to claim 1, wherein acquiring the first device message sent by the Internet-of-Things device comprises:
   calling a message monitoring module in a preloaded message processing plug-in to acquire the first device message sent by the Internet-of-Things device;
   wherein acquiring the topic mapping relationship configuration information in the configuration database, and determining the target stream processing topic name corresponding to the Internet-of-Things device according to the target message transmission topic name and the topic mapping relationship configuration information comprise:
   calling a rule engine module in the message processing plug-in to acquire the topic mapping relationship configuration information in the configuration database, and determining the target stream processing topic name corresponding to the Internet-of-Things device according to the target message transmission topic name and the topic mapping relationship configuration information; and
   wherein generating the second device message based on the target device data and the target stream processing topic name, and sending the second device message to the stream processing server corresponding to the target stream processing topic name comprise:
   calling a stream processing client module in the message processing plug-in to generate the second device message based on the target device data and the target stream processing topic name, and sending the second device message to the stream processing server corresponding to the target stream processing topic name.

6. The method according to claim 1, wherein the acquisition server is a target acquisition server in an acquisition server cluster, and the target acquisition server is connected to the Internet-of-Things device; and wherein after acquiring the first device message sent by the Internet-of-Things device, the method further comprises:

determining an allowed acquisition server corresponding to the first device message based on the target message transmission topic name and an allowed message transmission topic name corresponding to each acquisition server in the acquisition server cluster; and in a case where the target acquisition server is not the allowed acquisition server, sending the first device message to the allowed acquisition server so that the allowed acquisition server performs message processing on the first device message.

7. The method according to claim 1, wherein sending the second device message to the stream processing server corresponding to the target stream processing topic name so that the stream processing server corresponding to the target stream processing topic name processes the second device message comprises:

sending the second device message to a stream processing server cluster so that a target stream processing server corresponding to the target stream processing topic name in the stream processing server cluster processes the second device message.

8. A non-transitory computer-readable storage medium storing a computer program, wherein the computer program, when executed by a processor, implements the message processing method according to claim 1.

9. A message processing system, comprising an Internet-of-Things device, an acquisition server and a stream processing server; wherein the acquisition server is configured to implement:

acquiring a first device message sent by an Internet-of-Things device, wherein the first device message comprises a target message transmission topic name and target device data generated by the Internet-of-Things device; wherein the target message transmission topic name refers to a data transmission topic name corresponding to the target device data generated by the Internet-of-Things device;

acquiring topic mapping relationship configuration information in a configuration database, wherein each stream processing topic name in the topic mapping relationship configuration information corresponds to at least one message transmission topic name; wherein the each stream processing topic name refers to a topic name in a stream processing server;

determining a target stream processing topic name corresponding to the Internet-of-Things device according to the target message transmission topic name and the topic mapping relationship configuration information; wherein the target message transmission topic name corresponds to one of the at least one message transmission topic name; and generating a second device message based on the target device data and the target stream processing topic name, and sending the second device message to a stream processing server corresponding to the target stream processing topic name so that the stream processing server corresponding to the target stream processing topic name processes the second device message.

10. The message processing system according to claim 9, wherein the acquisition server is configured to implement determining the target stream processing topic name corresponding to the Internet-of-Things device according to the target message transmission topic name and the topic mapping relationship configuration information in the following way:

matching the target message transmission topic name with message transmission topic prefix information in the topic mapping relationship configuration information to determine successfully matched target message transmission topic prefix information; and determining the target stream processing topic name corresponding to the Internet-of-Things device based on a stream processing topic name corresponding to the target message transmission topic prefix information in the topic mapping relationship configuration information.

11. The message processing system according to claim 10, wherein the acquisition server is configured to implement determining the target stream processing topic name corresponding to the Internet-of-Things device based on the stream processing topic name corresponding to the target message transmission topic prefix information in the topic mapping relationship configuration information in the following way:

in a case where at least two pieces of target message transmission topic prefix information exist, acquiring priority configuration information corresponding to each of the at least two pieces of target message transmission topic prefix information;

determining target matching prefix information from the at least two pieces of target message transmission topic prefix information based on the priority configuration information; and determining a stream processing topic name corresponding to the target matching prefix information in the topic mapping relationship configuration information as the target stream processing topic name corresponding to the Internet-of-Things device.

12. The message processing system according to claim 9, wherein the acquisition server is configured to implement generating the second device message based on the target device data and the target stream processing topic name in the following way:

acquiring a target message coding configuration scheme corresponding to the target stream processing topic name;

performing coding processing on the target device data based on the target message coding configuration scheme to determine target device coded data; and generating the second device message based on the target device coded data and the target stream processing topic name.

13. The message processing system according to claim 9, wherein the acquisition server is configured to implement acquiring the first device message sent by the Internet-of-Things device in the following way:

calling a message monitoring module in a preloaded message processing plug-in to acquire the first device message sent by the Internet-of-Things device;

wherein the acquisition server is configured to implement acquiring the topic mapping relationship configuration information in the configuration database, and determining the target stream processing topic name corresponding to the Internet-of-Things device according to the target message transmission topic name and the topic mapping relationship configuration information in the following way:

calling a rule engine module in the message processing plug-in to acquire the topic mapping relationship configuration information in the configuration database, and determining the target stream processing topic name corresponding to the Internet-of-Things device according to the target message transmission topic name and the topic mapping relationship configuration information; and wherein the acquisition server is configured to implement generating the second device message based on the target device data and the target stream processing topic name, and sending the second device message to the stream processing server corresponding to the target stream processing topic name in the following way:

calling a stream processing client module in the message processing plug-in to generate the second device message based on the target device data and the target stream processing topic name, and sending the second device message to the stream processing server corresponding to the target stream processing topic name.

14. The message processing system according to claim 9, wherein the acquisition server is a target acquisition server in an acquisition server cluster, and the target acquisition server is connected to the Internet-of-Things device; and wherein after acquiring the first device message sent by the Internet-of-Things device, the acquisition server is further configured to implement:

determining an allowed acquisition server corresponding to the first device message based on the target message transmission topic name and an allowed message transmission topic name corresponding to each acquisition server in the acquisition server cluster; and in a case where the target acquisition server is not the allowed acquisition server, sending the first device message to the allowed acquisition server so that the allowed acquisition server performs message processing on the first device message.

15. The message processing system according to claim 9, the acquisition server is configured to implement sending the second device message to the stream processing server corresponding to the target stream processing topic name so that the stream processing server corresponding to the target stream processing topic name processes the second device message in the following way:

sending the second device message to a stream processing server cluster so that a target stream processing server corresponding to the target stream processing topic name in the stream processing server cluster processes the second device message.

16. An electronic device, comprising:
at least one processor; and
a memory, which is configured to store at least one program;
wherein the at least one program, when executed by the at least one processor, causes the at least one processor to implement:

acquiring a first device message sent by an Internet-of-Things device, wherein the first device message comprises a target message transmission topic name and target device data generated by the Internet-of-Things device; wherein the target message transmission topic name refers to a data transmission topic name corresponding to the target device data generated by the Internet-of-Things device;

acquiring topic mapping relationship configuration information in a configuration database, wherein each stream processing topic name in the topic mapping relationship configuration information corresponds to at least one message transmission topic name; wherein the each stream processing topic name refers to a topic name in a stream processing server;

determining a target stream processing topic name corresponding to the Internet-of-Things device according to the target message transmission topic name and the topic mapping relationship configuration information; wherein the target message transmission topic name corresponds to one of the at least one message transmission topic name; and generating a second device message based on the target device data and the target stream processing topic name, and sending the second device message to a stream processing server corresponding to the target stream processing topic name so that the stream processing server corresponding to the target stream processing topic name processes the second device message.

17. The electronic device according to claim 16, wherein the at least one program, when executed by the at least one processor, causes the at least one processor to implement determining the target stream processing topic name corresponding to the Internet-of-Things device according to the target message transmission topic name and the topic mapping relationship configuration information in the following way:

matching the target message transmission topic name with message transmission topic prefix information in the topic mapping relationship configuration information to determine successfully matched target message transmission topic prefix information; and determining the target stream processing topic name corresponding to the Internet-of-Things device based on a stream processing topic name corresponding to the target message transmission topic prefix information in the topic mapping relationship configuration information.

18. The electronic device according to claim 17, wherein the at least one program, when executed by the at least one processor, causes the at least one processor to implement determining the target stream processing topic name corresponding to the Internet-of-Things device based on the stream processing topic name corresponding to the target message transmission topic prefix information in the topic mapping relationship configuration information in the following way:

in a case where at least two pieces of target message transmission topic prefix information exist, acquiring priority configuration information corresponding to each of the at least two pieces of target message transmission topic prefix information;

determining target matching prefix information from the at least two pieces of target message transmission topic prefix information based on the priority configuration information; and determining a stream processing topic name corresponding to the target matching prefix information in the topic mapping relationship configuration information as the target stream processing topic name corresponding to the Internet-of-Things device.

19. The electronic device according to claim 16, wherein the at least one program, when executed by the at least one processor, causes the at least one processor to implement generating the second device message based on the target device data and the target stream processing topic name in the following way:
- acquiring a target message coding configuration scheme corresponding to the target stream processing topic name;
- performing coding processing on the target device data based on the target message coding configuration scheme to determine target device coded data; and
- generating the second device message based on the target device coded data and the target stream processing topic name.

20. The electronic device according to claim 16, wherein the at least one program, when executed by the at least one processor, causes the at least one processor to implement acquiring the first device message sent by the Internet-of-Things device in the following way:
- calling a message monitoring module in a preloaded message processing plug-in to acquire the first device message sent by the Internet-of-Things device;
- wherein the at least one program, when executed by the at least one processor, causes the at least one processor to implement acquiring the topic mapping relationship configuration information in the configuration database, and determining the target stream processing topic name corresponding to the Internet-of-Things device according to the target message transmission topic name and the topic mapping relationship configuration information in the following way:
- calling a rule engine module in the message processing plug-in to acquire the topic mapping relationship configuration information in the configuration database, and determining the target stream processing topic name corresponding to the Internet-of-Things device according to the target message transmission topic name and the topic mapping relationship configuration information; and
- wherein the at least one program, when executed by the at least one processor, causes the at least one processor to implement generating the second device message based on the target device data and the target stream processing topic name, and sending the second device message to the stream processing server corresponding to the target stream processing topic name in the following way:
- calling a stream processing client module in the message processing plug-in to generate the second device message based on the target device data and the target stream processing topic name, and sending the second device message to the stream processing server corresponding to the target stream processing topic name.

* * * * *